US007464105B2

(12) United States Patent
Smith

(10) Patent No.: US 7,464,105 B2
(45) Date of Patent: Dec. 9, 2008

(54) METHOD FOR PERFORMING SEMI-AUTOMATIC DATASET MAINTENANCE

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/175,922

(22) Filed: Jul. 6, 2005

(65) Prior Publication Data

US 2007/0011208 A1 Jan. 11, 2007

(51) Int. Cl.
*G06F 17/30* (2006.01)

(52) U.S. Cl. ...................................... 707/102; 707/101

(58) Field of Classification Search ................. 707/101, 707/102, 202, 203, 204, 205; 717/104, 106, 717/116, 121, 137, 140; 709/209; 715/250; 711/161, 162, 173; 718/101; 714/11; 719/319
See application file for complete search history.

(56) References Cited

U.S. PATENT DOCUMENTS

| | | | | |
|---|---|---|---|---|
| 4,408,273 | A | 10/1983 | Plow | 707/202 |
| 4,855,907 | A | 8/1989 | Ferro, Jr. et al. | 707/204 |
| 5,021,949 | A * | 6/1991 | Morten et al. | 709/231 |
| 5,295,222 | A * | 3/1994 | Wadhwa et al. | 717/104 |
| 5,606,689 | A | 2/1997 | Nakagawa | 707/206 |
| 5,878,418 | A | 3/1999 | Plocyn et al. | 707/10 |
| 5,999,937 | A | 12/1999 | Ellard | 707/101 |
| 6,530,078 | B1 | 3/2003 | Shmid et al. | 717/138 |
| 6,594,676 | B1 | 7/2003 | Moore | 707/202 |
| 6,629,196 | B2 | 9/2003 | Artigalas et al. | 711/111 |
| 6,675,175 | B2 | 1/2004 | Branch et al. | 707/200 |
| 6,691,301 | B2 * | 2/2004 | Bowen | 717/114 |
| 7,149,753 | B2 * | 12/2006 | Lin | 707/104.1 |
| 7,185,017 | B1 * | 2/2007 | Cauvin et al. | 707/101 |
| 2002/0199173 | A1 * | 12/2002 | Bowen | 717/129 |
| 2003/0071838 | A1 | 4/2003 | Wen et al. | 715/705 |
| 2003/0101193 | A1 * | 5/2003 | L'Heureux | 707/101 |
| 2003/0105620 | A1 * | 6/2003 | Bowen | 703/22 |
| 2003/0115372 | A1 | 6/2003 | Goode et al. | 719/310 |
| 2003/0177473 | A1 * | 9/2003 | Banerjee et al. | 717/115 |
| 2003/0212528 | A1 | 11/2003 | Chandler | 702/179 |
| 2003/0233347 | A1 * | 12/2003 | Weinberg et al. | 707/3 |
| 2004/0172408 | A1 | 9/2004 | Klosterhalfen et al. | 707/103 R |
| 2005/0066016 | A1 * | 3/2005 | Bailey et al. | 709/220 |

* cited by examiner

*Primary Examiner*—Diane Mizrahi
(74) *Attorney, Agent, or Firm*—Kunzler & McKenzie

(57) ABSTRACT

An apparatus, A method is disclosed for performing semi-automatic dataset maintenance. The method includes receiving a dataset qualifier. The dataset qualifier describes a collection of datasets. The method also receives a desired maintenance action to be applied to the datasets. A method retrieves a set of dataset identifiers that satisfy the dataset qualifier from a mainframe operating system. The method constructs a set of mainframe operating system commands to fulfill the desired maintenance action. The set of commands includes at least one command for each dataset.

15 Claims, 6 Drawing Sheets

400

402

```
HDELETE 'S840636.KBLA.CNTL.B040901A'
HDELETE 'S840636.KBLA.CNTL.B040902A'
HDELETE 'S840636.KBLA.CNTL.B040902B'
HDELETE 'S840636.KBLA.CNTL.B040902C'
HDELETE 'S840636.KBLA.CNTL.B040902D'
HDELETE 'S840636.KBLA.CNTL.B040905A'
DELETE 'S840636.KBLA.CNTL.B040915A'
DELETE 'S840636.KBLA.CNTL.B040915B'
```

```
HDELETE 'S840636.KBLA.CNTL.B040901A'
HDELETE 'S840636.KBLA.CNTL.B040902A'
HDELETE 'S840636.KBLA.CNTL.B040902B'
HDELETE 'S840636.KBLA.CNTL.B040902C'
HDELETE 'S840636.KBLA.CNTL.B040902D'
HDELETE 'S840636.KBLA.CNTL.B040905A'
```

FIG. 4B

METHOD FOR PERFORMING SEMI-AUTOMATIC DATASET MAINTENANCE

BACKGROUND OF THE INVENTION

1. Field of the Invention

This invention relates to dataset maintenance in a mainframe operating system environment and more particularly relates to performing semi-automatic dataset maintenance.

2. Description of the Related Art

Mainframe computers are powerful devices used for mission critical software applications. These applications typically generate datasets that store application results. A dataset is a collection of data stored together under a single name. Datasets may reside in volatile memory, or in non-volatile memory such as a disk drive or magnetic tape. Certain software applications can quickly generate numerous related datasets. Typically, each related dataset is named using a convention such that related datasets are easily recognized.

Ongoing use of mainframe applications can generate a large number of datasets. Some datasets contain critical information, such as financial records. However, many datasets do not contain critical information and simply consume storage space.

Managing datasets is an important maintenance function performed by mainframe computer operators. Computer operators regularly manage datasets by performing maintenance actions such as deleting datasets, archiving datasets, deleting archived datasets, recalling datasets from an archive, renaming datasets, and copying datasets. To complete these actions using conventional mainframe operating systems, an operator either manually issues a maintenance command for each dataset to the mainframe operating system, or manually creates a batch file with a maintenance command entry for each dataset.

Due to the large number of datasets created, and the fact that applications often create large sets of related datasets, issuing maintenance commands for a set of related datasets is very time consuming. Issuing the maintenance commands requires numerous keystrokes. Consequently, the process of issuing maintenance commands is prone to error. In addition to the time required to type maintenance commands, operators often need to wait for a period of time after issuing a command before a subsequent command can be issued.

From the foregoing discussion, it should be apparent that a need exists for a method that perform semi-automatic dataset maintenance. Beneficially, such a method would reduce the number of keystrokes required to issue maintenance commands to a mainframe operating system and would consequently eliminate errors. Additionally, such a method would increase efficiency for mainframe computer operators.

SUMMARY OF THE INVENTION

The present invention has been developed in response to the present state of the art and, in particular, in response to the problems and needs in the art that have not yet been fully solved by currently available dataset maintenance tools. Accordingly, the present invention has been developed to provide a method for performing semi-automatic dataset maintenance that overcome many or all of the above-discussed shortcomings in the art.

The apparatus to perform semi-automatic dataset maintenance is provided with a logic unit containing a plurality of modules configured to functionally execute the necessary steps of performing semi-automatic dataset maintenance. These modules in the described embodiments include an input module, a retrieval module, and a command module.

The input module receives a dataset qualifier describing a plurality of datasets. The dataset qualifier is a string of alphanumeric text. The input module also receives a desired maintenance action to be applied to the datasets. In one embodiment, the maintenance action is a delete action, delete archive action, archive action, recall action, rename action, or a copy action. The datasets, in one embodiment, are Information Management System (IMS) database datasets, DB2 database datasets, Oracle database datasets, z/OS datasets, or Virtual Sequential Access Method (VSAM) datasets. Preferably, the input module also receives a new name expression when the maintenance action is one of a rename action and a copy action.

A retrieval module retrieves a set of dataset identifiers that satisfy the dataset qualifier from a mainframe operating system. In one embodiment, the dataset identifier includes at least one of a dataset name, time of creation information, and a at storage volume name for each dataset.

A command module constructs a set of mainframe operating system commands to fulfill the desired maintenance action. The set of commands includes at least one command for each dataset satisfying the dataset qualifier. The commands, in one embodiment, are Time Sharing Option (TSO) commands. Preferably, the command module utilizes the new name expression received by the input module to generate commands that create new names for the datasets in the case of a copy action or a rename action.

Preferably, the command module selects at least one mainframe operating system command for each dataset from a set of related mainframe operating system commands that fulfill a desired maintenance action based on a portion of the dataset identifier of each dataset.

In one embodiment, the command module generates a file configured to execute as a batch job in the background of a mainframe operating system. The file includes the constructed mainframe operating system commands. Preferably, the apparatus includes an editing module. The editing module adds, deletes, or modifies one or more of the dataset identifiers in response to user input.

In one embodiment, the apparatus includes an execution module. The execution module submits the set of commands constructed by the command module to the mainframe operating system for execution. In one embodiment, the execution module submits the set of commands for execution in the foreground of the mainframe operating system. In another embodiment, the execution module submits the set of commands as a batch file for execution in the background of the mainframe operating system.

Preferably, the apparatus includes a comparison module. The comparison module receives one or more conditions associated with applying the desired maintenance action to the datasets. The comparison module removes datasets from the set of dataset identifiers that do not satisfy the conditions.

A system of the present invention is also presented to perform semi-automatic dataset maintenance. The system includes a maintenance module comprising the modules of the apparatus. In particular, the system, in one embodiment, includes a processor, a storage device, Input/Output (I/O) devices, a communication bus, and a memory. The processor executes software to manage operations of the system. The storage device stores a plurality of datasets. The I/O devices interact with a user. The communication bus operatively couples the processor, storage device, I/O devices, and memory.

The memory may include a user interface, the maintenance module, and a mainframe operating system. A user may provide input to the maintenance module through the I/O devices and user interface. Additionally, the results of the dataset maintenance action may be displayed for the user using the I/O devices.

A method of the present invention is also presented for performing semi-automatic dataset maintenance. The method in the disclosed embodiments substantially includes the steps necessary to carry out the functions presented above with respect to the operation of the described apparatus and system. In one embodiment, the method receives a dataset qualifier describing a plurality of datasets.

Next, a set of dataset identifiers is retrieved from a mainframe operating system. A desired maintenance action for the datasets is received. Finally, a set of mainframe operating system commands configured to fulfill the desired maintenance action is constructed. The method also may include submitting the set of commands to the mainframe operating system for execution in either the foreground or background.

In a further embodiment, the method includes receiving a new name expression for at least one of a rename action and a copy action and utilizing the new name expression to generate mainframe operating system commands that properly name the renamed or copied datasets. In a further embodiment, the method includes editing the set of dataset identifiers in response to user input. In yet another embodiment, the method includes receiving one or more conditions and removing datasets not satisfying the conditions from the set of dataset identifiers.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A is a chart illustrating an example set of mainframe operating system commands;

FIG. 4B is a chart illustrating an example set of mainframe operating system commands;

DETAILED DESCRIPTION OF THE INVENTION

Figure 1A:
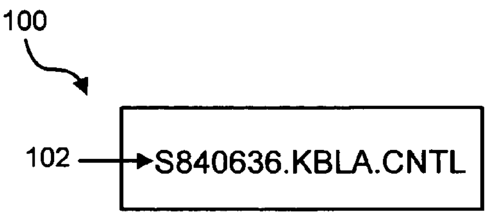
FIG. 1A is a chart illustrating an example dataset qualifier.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as mere electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1A is a chart 100 illustrating an example dataset qualifier 102. A dataset qualifier 102 is a text string used to describe a set of related datasets.

Figure 1B:
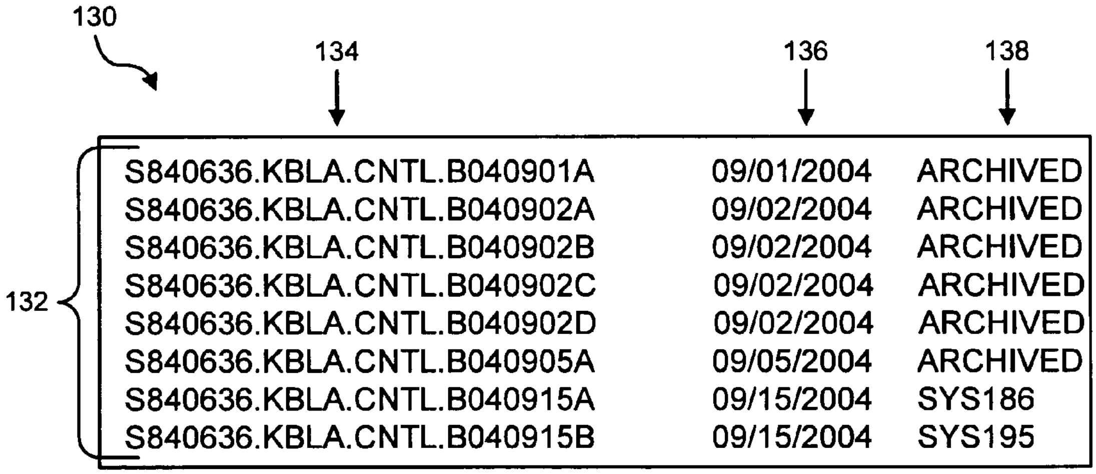
FIG. 1B is a chart illustrating an example set of dataset identifiers.

FIG. 1B is a chart 130 illustrating an example set of dataset identifiers 132. Each dataset identifier 132 may include a dataset name 134, time of creation information 136, and a dataset storage volume name/status 138. Each dataset identifier 132 satisfies a dataset qualifier 102. For example, the dataset identifiers 132 in FIG. 1B each satisfy the dataset qualifier 102 of FIG. 1A. The dataset qualifier 102 "S840636.KBLA.CNTL" is a common portion of each of the dataset names 134 of FIG. 1B.

Typically, an operator performs a maintenance function on a group of related datasets. The operator may use a dataset qualifier 102 to obtain a list of dataset identifiers 132 satisfying the dataset qualifier from a mainframe operating system. The operator then applies the maintenance function to each of the datasets represented by the dataset identifiers 132 by manually issuing a command to the mainframe operating system for each dataset.

Figure 1C:
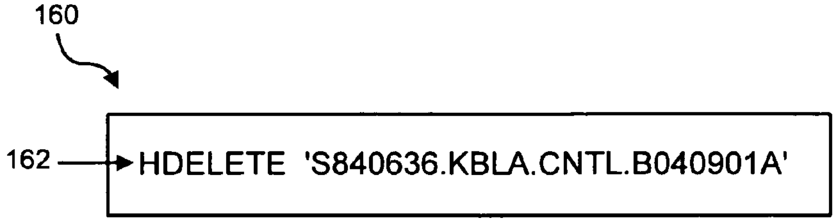
FIG. 1C is a chart illustrating an example mainframe operating system command.

FIG. 1C is a chart 160 illustrating an example dataset maintenance command 162 for deleting a single dataset. If an operator desired to delete all datasets related by the dataset qualifier 102 of FIG. 1A, the operator would need to issue eight distinct commands, one for each dataset identifier 132 listed in the chart 130 of FIG. 1B. Completing this simple delete operation involves a significant number of keystrokes and consumes valuable operator time.

Figure 2:
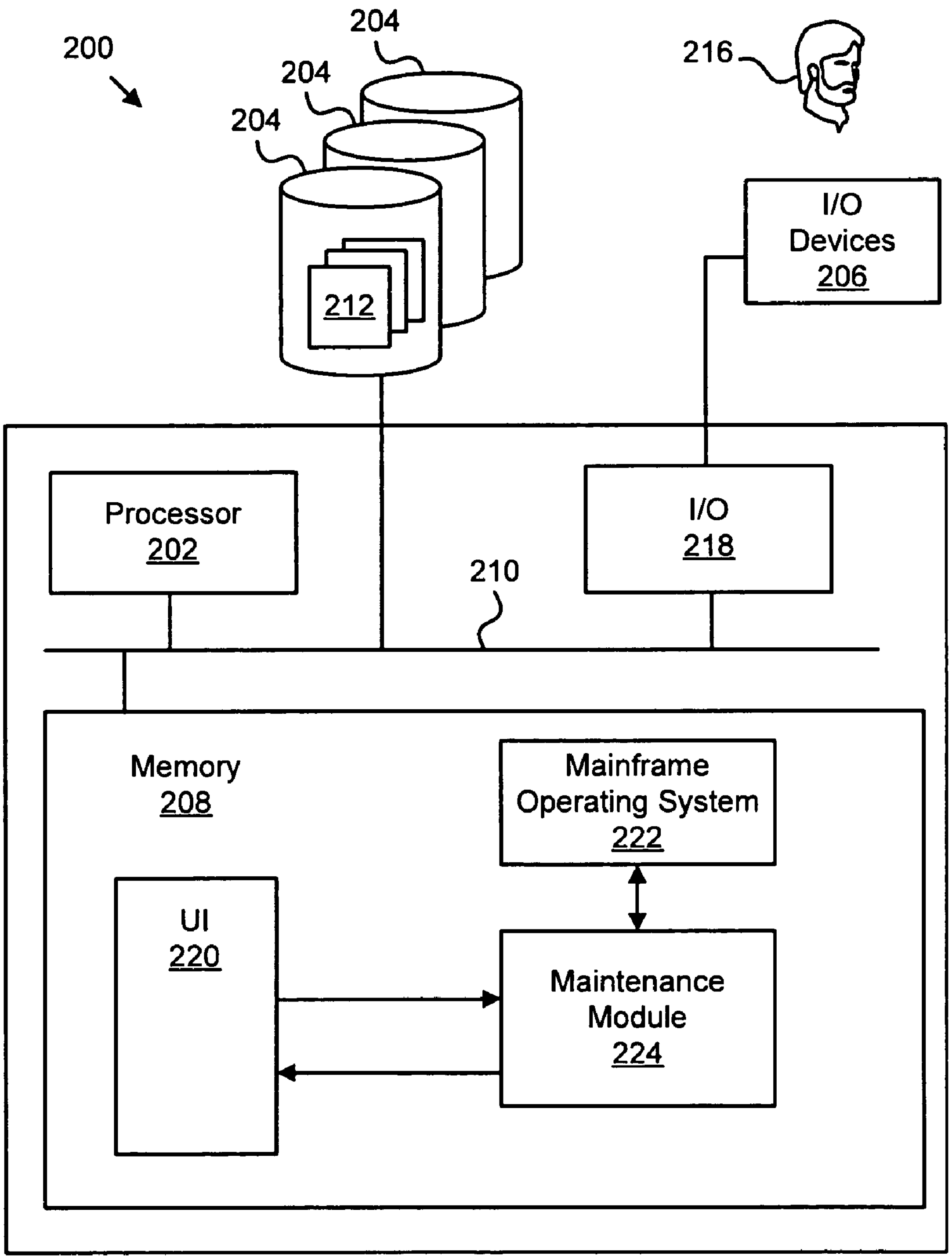
FIG. 2 is a schematic block diagram illustrating one embodiment of a system for performing semi-automatic dataset maintenance in accordance with the present invention.

FIG. 2 illustrates one embodiment of a system 200 for performing semi-automatic dataset maintenance. The system 200 includes a processor 202, one or more storage volumes 204, I/O devices 206, a memory 208, and a communication bus 210. Those of skill in the art will recognize that the system 200 may be more simple or complex than illustrated so long as the system 200 includes modules or sub-systems that correspond to those described herein. In one embodiment, the system 200 comprises hardware and/or software more commonly referred to as a zSeries/Operating System (z/OS).

Typically, the processor 202 comprises one or more central processing units executing software and/or firmware to control and manage the other components within the system 200. The storage volumes 204 provide persistent storage of data. In particular, the storage volumes 204 store a plurality of data sets 212.

The I/O devices 206 permit a user 216 to interface with the system 200. The I/O devices 206 include standard devices such as a keyboard, monitor, mouse, and the like. One or more I/O controllers 218 couple the I/O devices 206 to the communication bus 210. The I/O controllers 218 manage data flow between the components of the system 200 and the I/O devices 206.

The communication bus 210 operatively couples the processor 202, memory 208, I/O controllers 218, and storage volumes 204. The communication bus 210 may implement a variety of communication protocols including Peripheral Communication Interface, Small Computer System Interface, and the like.

The memory 208 may include a User Interface (UI) 220, a mainframe operating system 222, and a maintenance module 224. The UI 220 may comprise a command line interface, an entry panel-driven interface, a Graphical User Interface (GUI), a batch interface, or a combination of these. The user 216 may enter predefined commands, operators, or data values into the UI 220 to define a dataset qualifier 102. Preferably, the UI 220 checks user input to ensure that syntax and semantics rules are satisfied.

The UI 220 provides a dataset qualifier 102 to the maintenance module 224. The UI 220 may comprise Interactive System Productivity Facility (ISPF) panels used with the z/OS mainframe operating system 222. Alternatively, a script, software code, or the like may provide the dataset qualifier 102 to the maintenance module 224. The maintenance module 224 retrieves a set of dataset identifiers 132 that satisfy the dataset qualifier 102 from the mainframe operating system 222. The datasets 212 represented by the dataset identifiers 132 satisfying the dataset qualifier 102 may be located on more than one storage volume 204.

The UI 220 provides a desired maintenance action to be applied to the datasets 212 described by the dataset identifiers 132 to the maintenance module 224. The maintenance module 224 uses the desired maintenance action to construct a set of mainframe operating system commands designed to fulfill the desired maintenance action. The set of commands includes at least one command 162 for each dataset 212 represented by the dataset identifiers 132 satisfying the dataset qualifier 102. In one embodiment, the maintenance module 224 submits the set of commands to the mainframe operating system 222 for execution either in the foreground of the operating system or in the background of the operating system as a batch job.

Figure 3:
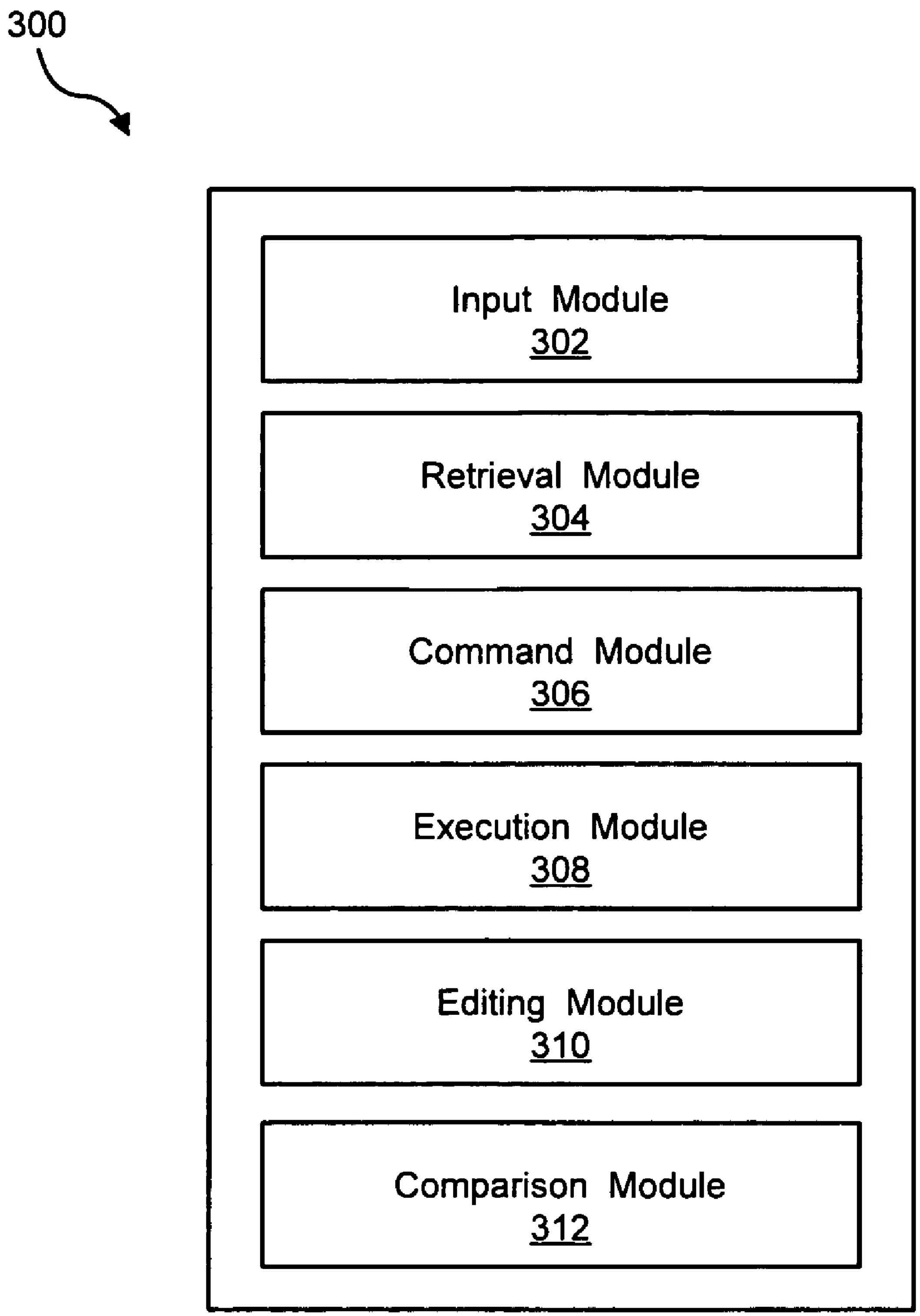
FIG. 3 is a schematic block diagram illustrating one embodiment of an apparatus for performing semi-automatic dataset maintenance in accordance with the present invention.

FIG. 3 depicts one embodiment of a maintenance module 300. Preferably, the maintenance module 300 is configured to serve as the maintenance module 224 described above in relation to FIG. 2. The maintenance module 300 includes an input module 302, a retrieval module 304, and a command module 306.

The input module 302 receives a dataset qualifier 102 describing a plurality of datasets 212. The dataset qualifier 102 is a string of alphanumeric text describing a set of datasets 212. The dataset qualifier 102 typically comprises a portion of a dataset name 134. The dataset qualifier 102 may include a wildcard character such as a "*" or "?" that substitutes for one or more alphanumeric characters.

The input module 302 also receives a desired maintenance action to be applied to the datasets 212 satisfying the dataset qualifier 102. In one embodiment, the maintenance action may be a delete action, a delete archive action, an archive action, a recall action, a rename action, or a copy action. A delete action deletes datasets 212 from storage volumes 204. A delete archive action deletes datasets 212 from archived storage volumes such as magnetic tapes. An archive action moves datasets 212 to an archive storage volume such as a magnetic tape. A recall action moves datasets 212 from archived storage such as magnetic tapes to a storage volume 204 such as a hard disk drive. A rename action changes the names of datasets 212. A copy action copies datasets 212 and names the copied versions of the datasets 212.

Of course, the input module 302 may also receive other dataset maintenance actions that manipulate datasets 212. A user 216 may supply the input module 302 with the desired maintenance action through a user interface 220. Alternatively, the input module 302 may receive the desired maintenance function from a file, a script, a batch job, software code, or the like. The datasets 212, in one embodiment, may be of a specific type such as Information Management System (IMS) database datasets, DB2 database datasets, Oracle database datasets, z/OS datasets, or Virtual Sequential Access Method (VSAM) datasets.

Preferably, the input module 302 also receives a new name expression when the maintenance action is a rename action or a copy action. When a rename action is performed on a dataset 212, a new name is applied to the dataset 212. Similarly, when a copy action is performed on a dataset 212, a new name is applied to the copied dataset 212 since the original dataset 212 and the copied dataset are typically not allowed to have the same name. The new name expression specifies a format to be used to create a new name. A new name expression may comprise wildcards or other text indicators that specify a technique for generating the new name.

For example, a new name expression "S8400.KBLA.BAK.*" may be used with a dataset name "S840636.KBLA.CNTL.B040901A" to create a new name "S8400.KBLA.BAK.B040901A." In the depicted example, the new name expression specifies that the first three fields of the new name are "S8400.KBLA.BAK." The asterisk (wild card indicator) in the new name expression specifies that the last field of the new name comes from the original name. In this example the last field of the original name, "B040901A" is appended to the explicit fields of the new name expression, "S8400.KBLA.BAK" to form the new name "S8400.KBLA.BAK.B040901A."

A single new name expression may be used to create new names for a set of datasets 212. For example, the single new name expression described above, "S8400.KBLA.BAK.*," may be used to specify new names for all eight of the dataset identifiers 132 depicted in FIG. 1B. In addition to the new name expression described above, one of skill in the art will recognize a variety of additional techniques for creating new name expressions capable of generating new names for a set of datasets 212 using a single new name expression.

Of course, those of skill in the art will recognize that the input module 302 may receive its inputs as part of a single input or as a series of individual inputs. For example, a single input to the input module 302 may include the dataset qualifier 102 and the desired maintenance action. Optionally, the single input may include additional data set maintenance actions, data set type qualifiers, new name expressions, and the like.

The retrieval module 304 retrieves a set of dataset identifiers 132 satisfying the dataset qualifier 102 from a mainframe operating system 222. In one embodiment, the retrieval module 304 submits a list command to the mainframe operating system 222. The retrieval module 304 includes the dataset qualifier 102 with the list command. In certain embodiments, the retrieval module 304 may edit the dataset qualifier 102 to conform to a proper format before including the dataset qualifier 102 in the list command.

For example, if the dataset qualifier is "S840636.KBLA.CNTL" the retrieval module 304 may submit a "LISTC LEV('S840636.KBLA.CNTL') ALL" command to a z/OS mainframe operating system 222. In this example "LISTC" is the list command and "LEV ('S840636.KBLA.CNTL') ALL" is an edited dataset qualifier. Editing the dataset qualifier may be necessary to comply with a particular format expected by the mainframe operating system 222. Editing may be performed automatically by the retrieval module 304 and/or in conjunction with certain user input.

In response to the list command, the mainframe operating system 222 provides the retrieval module 304 with a text description of the datasets 212 satisfying the dataset qualifier 102. The text description may vary according to the mainframe operating system 222. In one embodiment, the text description returned by the mainframe operating system 222 comprises a dataset identifier 132 including a dataset name 134, time of creation information 136, and a storage volume name 138 for each dataset 212 satisfying the dataset qualifier 102. In another embodiment, the text description may include size information, last access time, or the like.

If necessary, the retrieval module 304 deletes unnecessary information from the text description returned by the mainframe operating system 222 such as blank lines, titles, formatting characters, and the like. The remaining information comprises a set of dataset identifiers 132. Alternatively, the retrieval module 304 may cooperate with a file system and scan files of the file system to generate a list of dataset identifiers 132. In yet another embodiment, the retrieval module 304 may retrieve the dataset identifiers 132 from a database using the dataset qualifier 102 as a query.

The command module 306 constructs a set of mainframe operating system commands to fulfill the desired maintenance action. The command module 306 converts the set of dataset identifiers 132 created by the retrieval module 304 into a set of mainframe operating system commands to fulfill the maintenance action received by the input module 302.

FIG. 4A is a chart 400 illustrating a set of mainframe operating system commands 402 created by the command module 306 to fulfill a delete maintenance action for datasets 212 identified by the dataset qualifier 102 of FIG. 1A. The set of commands 402 includes a command corresponding to each of the dataset identifiers 132 of FIG. 1B. The commands 402 in this example are Time Sharing Option (TSO) commands suitable for use with a z/OS mainframe operating system. The automatic creation of the set of mainframe operating system commands 402 by the command module 306 is advantageous because it eliminates the need for an operator to manually type each of the mainframe operating system commands 402.

In one embodiment, the command module 306 may automatically convert the desired maintenance action supplied by the input module 302 to different, but related, commands based on the state of the dataset 212. For example, a user 216 may desire to delete a set of datasets 212 satisfying a dataset qualifier 102. However, certain datasets 212 satisfying the dataset qualifier 102 may be archived and other datasets 212 satisfying the dataset qualifier 102 may not be archived.

The command module 306 (See FIG. 3) examines the set of dataset identifiers 132 provided by the retrieval module 304 to distinguish between archived datasets and non-archived datasets. In particular, the command module 306 examines the dataset storage volume name/status 138 to detect archived datasets. Consequently, the command module 306 may automatically create a set of commands 402 using a "delete archive" command, such as the "HDELETE" TSO command, for the archived datasets 212 and a "delete" command, such as the "DELETE" TSO command, for datasets 212 that are not archived.

In another example, the command module 306 may detect, from the dataset storage volume name/status 138, that certain datasets 212 described by the set of dataset identifiers 132 are VSAM datasets and other datasets 212 are z/OS datasets. In this example, the command module 306 creates commands using the "DELETE PURGE CLUSTER" TSO command for the VSAM datasets 212 and creates commands using the "DELETE" TSO command for z/OS datasets 212.

Preferably, the command module 306 utilizes the new name expression received by the input module 302 when creating rename or copy commands for rename and copy maintenance actions. The command module 306 interprets the new name expression in a manner as described above and creates new names for datasets 212 affected by rename or copy commands.

In one embodiment, the command module 306 generates a file containing the resulting set of commands 402. The command module 306 may configure the file to execute as a batch job in the background of the mainframe operating system 222. The file may also contain administrative commands necessary to properly begin and end the batch job, such as Job Control Language (JCL) commands.

In one embodiment, the apparatus 300 (See FIG. 3) includes an execution module 308. The execution module 308 submits the set of commands 402 constructed by the command module 306 to the mainframe operating system 222 (See FIG. 2) for execution. In one embodiment, the execution module 308 instructs the mainframe operating system 222 to execute the commands 402 in the foreground of the operating system 222. The mainframe operating system 222 executes the commands 402 sequentially; issuing subsequent commands only after the current command has finished executing. When the operating system 222 executes commands 402 in the foreground, the user 216 may be unable to issue other commands unrelated to dataset maintenance to the mainframe operating system 222 until execution of the set of commands 402 is complete.

In another embodiment, the execution module 308 submits the set of commands 402 to the mainframe operating system 222 as a batch file and instructs the mainframe operating system 222 to execute the commands in the background of the operating system 222. Since the mainframe operating system 222 executes the commands 402 in the background, the user 216 may issue other commands to the operating system 222 while the operating system 222 is executing the commands 402 in the batch file. Preferably, the mainframe operating system 222 notifies the execution module 308 once the batch file execution is complete.

Maintaining datasets 212 (See FIG. 2) with the apparatus 300 is semi-automatic, not automatic, since the input module 302 requires a dataset qualifier 102 and a desired maintenance action. However, once the input module 302 receives these parameters, the apparatus 300 applies the maintenance action to the datasets 212 satisfying the dataset qualifier 102 automatically. In contrast to conventional manual maintenance, the apparatus 300 automatically creates the proper set of maintenance commands 402 and preferably submits them to the operating system 222 for execution. Consequently, dataset maintenance using the apparatus 300 requires far fewer keystrokes, is less error prone, and requires less operator time than conventional manual dataset maintenance.

Preferably, the apparatus 300 (See FIG. 3) also includes an editing module 310. The editing module 310 preferably modifies the set of dataset identifiers 132 (See FIG. 1) retrieved by the retrieval module 304 before the command module 306 constructs a set of commands 402 corresponding to the set of dataset identifiers 132. The editing module 310 may provide a version of the set of dataset identifiers 132 to a user 216 so that the user 216 may preview the dataset identifiers 132. The editing module 310 may provide the set of dataset identifiers 132 to the UI 220 for display to the user 216. Alternatively, the editing module 310 may make a file containing a version of the set of dataset identifiers 132 available to the user 216. Of course, the editing module 310 may use other techniques well known to those of skill in the art to provide the set of dataset identifiers 132 to the user 216.

If desired, the user 216 may edit the set of dataset identifiers 132 provided by the editing module 310 by adding additional identifiers to the set, deleting identifiers from the set, or modifying identifiers within the set. The ability to edit the set of dataset identifiers 132 enables the user 216 to preview the datasets 212 and make desired changes to the set of dataset identifiers 132 before the maintenance action is applied.

In one embodiment, the user 216 edits a text file containing the set of dataset identifiers 132 by adding lines to the file, deleting lines, or modifying existing lines. Once the user 216 has made desired changes to the set of dataset identifiers 132, the editing module 310 receives the edited version of the set of dataset identifiers 132. The editing module 310 may update the original set of dataset identifiers 132 to reflect the changes received from the user 216. The editing module 310 may then provide the updated set of dataset identifiers to the command module 306.

In one embodiment, the editing module 310 suspends further operation of the apparatus 300 until the editing module 310 receives the edited version of the set of dataset identifiers 132. In another embodiment, the editing module 310 waits a predetermined amount of time for an edited version of the set of dataset identifiers 132. If the predetermined amount of time expires before the editing module 310 receives an edited version of the set of dataset identifiers 132, the apparatus 300 may continue operation with the original set of dataset identifiers 132.

Preferably, the apparatus 300 includes a comparison module 312. The comparison module 312 receives one or more conditions associated with applying the desired maintenance action to the datasets 212 from the user interface 220. Alternatively, the comparison module 312 may receive the conditions from a file, a script, a batch job, software code, or the like. The comparison module 312 evaluates the conditions with respect to each identifier in the set of dataset identifiers 132. The comparison module 312 removes identifiers that do not satisfy the conditions from the set of dataset identifiers 132 before the command module 306 constructs commands for the set of dataset identifiers 132.

The comparison module 312 applies the conditions to the dataset identifier. If the dataset identifier comprises a dataset name 134, time of creation information 136, and a dataset storage volume name 138, acceptable conditions may be written that reference the dataset name 134, dataset storage volume name 138, and time of creation information 136. For example, the comparison module 312 may apply a condition specifying a maintenance action for datasets 212 that are stored on a particular storage volume. Such a condition may be based on the dataset storage volume name. Another condition may specify a maintenance action for datasets 212 created before a particular date. Such a condition may be based on the time of creation information 136.

FIG. 4B is a chart 450 illustrating the application of a condition to a set of dataset identifiers 132. In an example illustrated by FIG. 4B, a condition specifying that archived datasets are to be deleted has been applied to the set of dataset identifiers 132 illustrated in FIG. 1B. The first six datasets illustrated in FIG. 1B are archived, as indicated by the dataset storage volume name 138 "ARCHIVED." The last two datasets in FIG. 1B are not archived, as indicated by the dataset storage volume names 138 "SYS186" and "SYS 195."

The comparison module 312 applies the condition that archived datasets are to be deleted to each dataset identifier 132 and determines that only the first six dataset identifiers 132 satisfy the condition. The comparison module 312 deletes the last two entries from the set of dataset identifiers 132 and creates an updated set of dataset identifiers 452, illustrated in the chart 450 of FIG. 4B. The comparison module 312 provides the updated set of dataset identifiers 452 to the command module 306.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
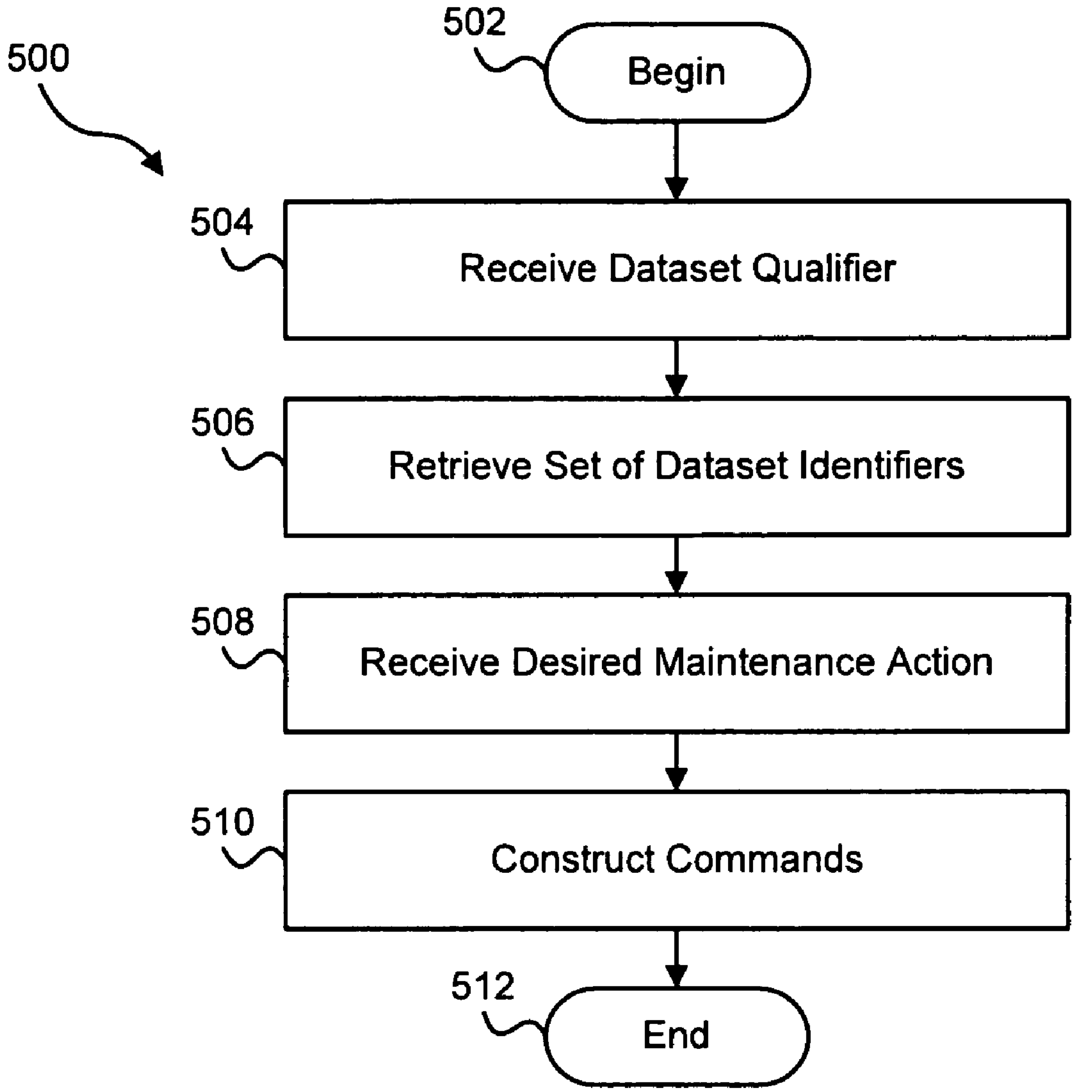
FIG. 5 is a schematic flow chart diagram illustrating one embodiment of a method for performing semi-automatic dataset maintenance in accordance with the present invention.

FIG. 5 is a flow chart diagram illustrating one embodiment of a method 500 for performing semi-automatic dataset maintenance in accordance with the present invention. Preferably, the method 500 is implemented in a conventional system by modifying computer readable code to implement the maintenance module 300 described above. The method 500 begins 502 when the input module 302 receives 504 a dataset qualifier 102 describing a plurality of datasets 212. As mentioned above, the input module 302 may receive the dataset qualifier 102 from a user 216 or from another source such as a file, a script, a batch job, software code, or the like.

Next, the retrieval module 304 retrieves 506 a set of dataset identifiers 132 satisfying the dataset qualifier 102 preferably by submitting a list command to a mainframe operating system 222. Of course, the retrieval module 304 may use other well known techniques for retrieving the set of dataset identifiers 132. In certain embodiments, the retrieval module 304 edits the dataset qualifier 102 to conform to a proper format before including the dataset qualifier 102 in the list command. If necessary, the retrieval module 304 deletes unnecessary information from the text description returned by the mainframe operating system 222 such as blank lines, titles, formatting characters, and the like.

Next, the input module 302 receives 508 a desired maintenance action using a UI 220, a file, a script, a batch job, software code, or the like. The maintenance action will be applied to the datasets 212 described by the dataset qualifier 102. Finally, the command module 306 constructs 510 a set of mainframe operating system commands 402 configured to fulfill the desired maintenance action in substantially the same manner as described above in relation to FIGS. 3 and 4A. In one embodiment, the command module 306 generates a batch file containing the set of mainframe operating system commands 402. The method 500 ends 512.

Figure 6:
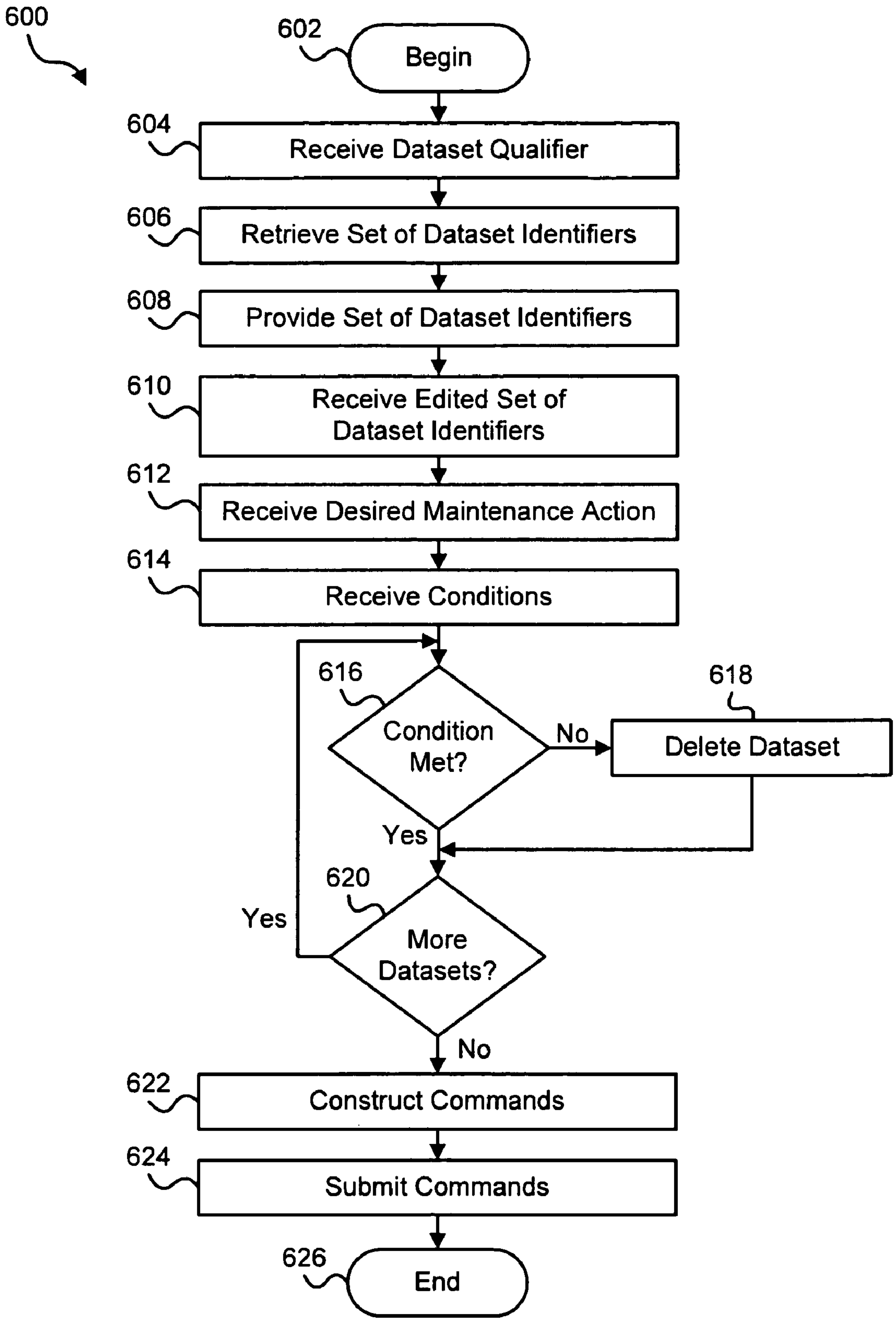
FIG. 6 is a schematic flow chart diagram illustrating another embodiment of a method for performing semi-automatic dataset maintenance in accordance with the present invention.

FIG. 6 is a flow chart diagram illustrating an additional embodiment of a method 600 for performing semi-automatic dataset maintenance in accordance with the present invention. Preferably, the method 600 is implemented in a conventional system by modifying computer readable code to implement one embodiment of the maintenance module 224 (See FIG. 2) described above. The method 600 begins 602 when the input module 302 receives 604 a dataset qualifier 102 describing one or more datasets 212.

Next, the retrieval module 304 retrieves 606 a set of dataset identifiers 132 satisfying the dataset qualifier 102 by submitting a list command to a mainframe operating system 222. The editing module 310 may provide 608 a version of the set of dataset identifiers 132 to a user 216 for review. The editing module 310 may receive 610 an edited version of the dataset identifiers from the user 216 and may update the set of dataset identifiers 132 to match the edited version of the dataset identifiers. If the user 216 makes no edits, the dataset identifier 132 may be unchanged.

Next, the input module 302 receives 612 a desired maintenance action to be applied to the datasets 212 described by the dataset qualifier 102 using a UI 220, a file, a script, a batch job, software code, or the like. The input module 302 may then receive 614 one or more conditions associated with applying the desired maintenance action to the datasets 212 from a user interface 220, a script, a batch job, software code, or the like. The comparison module 312 determines 616 if the first dataset identified by its identifier satisfies the condition.

If the first dataset does not satisfy the condition, the comparison module 312 deletes 618 the first dataset identifier 132 from the set of dataset identifiers 132. If the first dataset satisfies the condition, the comparison module 312 determines 620 if there are additional dataset identifiers 132 in the set of dataset identifiers 132. If there are additional dataset identifiers 132, the comparison module 312 determines 616 if the second dataset satisfies the condition. The cycle continues until the comparison module 312 has evaluated all of the dataset identifiers 132 in the set of dataset identifiers 132 with respect to the condition.

Next, the command module 306 constructs 622 a set of mainframe operating system commands 402 configured to fulfill the desired maintenance action in substantially the same manner as described above in relation to FIGS. 3 and 4A. Alternatively, the commands 402 may be configured for a file system or other storage management system. Finally, the execution module 308 may submit 624 the set of commands 402 constructed by the command module 306 to the mainframe operating system 222, or other suitable dataset management systems, for execution.

In one embodiment, the execution module 308 instructs the mainframe operating system 222 to execute the commands 402 in the foreground. In another embodiment, the execution module 308 submits the set of commands 402 to the mainframe operating system 222 as a batch file and instructs the mainframe operating system 222 to execute the commands in the background. The method 600 ends 626.

A method for servicing a client uses the apparatus 300 to perform semi-automatic dataset maintenance in accordance with the present invention. A client or customer may provide a dataset qualifier 102 describing one or more datasets 212 and a desired maintenance action to the input module 302 of the apparatus 300. Alternatively, the client may simply describe verbally, or in text, how certain data sets are to be maintained. A service provider may then determine the dataset qualifier 102 and proper maintenance action.

Alternatively, the client or service provider may provide the dataset qualifier 102 and desired maintenance action to a UI 220. Next, the apparatus 300 retrieves a set of dataset identifiers 132 satisfying the dataset qualifier 102 from a mainframe operating system 222, and constructs a set of mainframe operating system commands 402 configured to fulfill the desired maintenance action. The apparatus 300 may optionally permit the client or service provider to edit the set of dataset identifiers 132.

A service provider may utilize the method described above to perform services for a client. For example, a client regularly executing a mainframe application may generate a large number of datasets 212. Rather than manually deleting unnecessary datasets 212 one at a time, the client may request assistance from a service provider. Next, the service provider determines a dataset qualifier 102 describing the unnecessary dataset(s) and a delete maintenance action. The service provider then provides the dataset qualifier 102 and delete maintenance action to the input module 302 of the apparatus 300.

The apparatus 300 then follows the method 500 described above in relation to FIG. 5 to create a set of mainframe operating system or other dataset management commands 402 to fulfill the delete maintenance action. Preferably, the apparatus 300 submits the set of commands 402 to the mainframe operating system 222. Alternatively, the service provider may provide the set of commands 402 to the client in a batch file so the client may subsequently submit the set of commands 402 to the mainframe operating system 222.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to perform operations to perform semi-automatic mainframe dataset maintenance, the method comprising:

receiving a dataset qualifier describing a plurality of mainframe datasets, the dataset qualifier comprising a dataset label prefix configured to facilitate locating a set of dataset identifiers;

retrieving the set of dataset identifiers satisfying the dataset qualifier from a mainframe operating system;

receiving a desired maintenance action to apply to the datasets, the desired maintenance action selected from the group comprising delete, delete archive, archive, recall, rename, and copy; and constructing a set of mainframe operating system commands to fulfill the desired maintenance action such that semi-automatic mainframe dataset maintenance is performed with minimal input from a user, the set of commands including at least one command for each dataset, the mainframe operating system commands comprising Time Sharing Option (TSO) commands.

2. The method of claim 1, further comprising an operation to submit the set of commands to the mainframe operating system for execution.

3. The method of claim 2, wherein the set of mainframe operating system commands are submitted to execute in the foreground of the mainframe operating system.

4. The method of claim 1, wherein constructing further comprises generating a file configured to execute as a batch job, the file comprising the mainframe operating system commands.

5. The method of claim 2, wherein:

constructing further comprises generating a file configured to execute as a batch job, the file comprising the mainframe operating system commands; and the set of mainframe operating system commands are submitted to execute as a batch job in the background of the mainframe operating system.

6. The method of claim 1, further comprising:

receiving a new name expression in response to the maintenance action comprising one of a rename action and a copy action; and utilizing the new name expression to generate mainframe operating system commands that determine names for the datasets in accordance with the desired maintenance action.

7. The method of claim 1, further comprising editing the set of dataset identifiers in response to user input.

8. The method of claim 1, further comprising:

receiving a condition associated with applying the desired maintenance action; and removing a dataset not satisfying the conditions from the set of dataset identifiers.

9. The method of claim 1, wherein the set of dataset identifiers comprises a name, a storage volume name, and time of creation information for each dataset.

10. The method of claim 1, wherein constructing further comprises selecting at least one mainframe operating system command for each dataset from a set of related mainframe operating system commands that fulfill a desired maintenance action based on a portion of the dataset identifier of each dataset.

11. The method of claim 1, wherein the datasets are located on a storage volume.

12. The method of claim 1, wherein the dataset qualifier and desired maintenance action are received from user through a user interface.

13. A method for performing semi-automatic mainframe dataset maintenance for a client, the method comprising:

providing a dataset qualifier describing a plurality of mainframe datasets and a desired maintenance action to apply to the datasets, the dataset qualifier comprising a dataset label prefix configured to facilitate locating a set of dataset identifiers, the desired maintenance action selected from the group comprising delete, delete archive, archive, recall, rename, and copy;

using a maintenance apparatus to retrieve a set of dataset identifiers satisfying the dataset qualifier from a mainframe operating system, and construct a set of mainframe operating system commands to fulfill the desired maintenance action for the datasets associated with the dataset identifiers, such that semi-automatic mainframe dataset maintenance is performed, the set of commands including at least one command for each dataset and comprising Time Sharing Option (TSO) commands;

receiving a new name expression in response to the maintenance action comprising one of a rename action and a copy action; and utilizing the new name expression to generate mainframe operating system commands that determine names for the datasets in accordance with the desired maintenance action.

14. The method of claim 13, further comprising using the maintenance apparatus to submit the set of commands to the mainframe operating system for execution.

15. The method of claim 13, further comprising using the maintenance apparatus to, receive one or more conditions associated with applying the desired maintenance action; and remove one or more datasets not satisfying the conditions from the set of dataset identifiers.

* * * * *